(12) United States Patent
Stojanovski et al.

(10) Patent No.: US 11,863,975 B2
(45) Date of Patent: Jan. 2, 2024

(54) PROTECTION OF INITIAL NON-ACCESS STRATUM PROTOCOL MESSAGE IN 5G SYSTEMS

(71) Applicant: Apple Inc., Cupertino, CA (US)

(72) Inventors: Alexandre Saso Stojanovski, Paris (FR); Robert Zaus, Munich (DE); Farid Adrangi, Lake Oswego, OR (US); Raimund Wloka, Langenzenn (DE); Abhijeet Ashok Kolekar, Hillsboro, OR (US); Ahmed Soliman, Nuremberg (DE); Sudeep K. Palat, Cheltenham (GB)

(73) Assignee: Apple Inc., Cupertino, CA (US)

( * ) Notice: Subject to any disclaimer, the term of this patent is extended or adjusted under 35 U.S.C. 154(b) by 201 days.

(21) Appl. No.: 17/290,757

(22) PCT Filed: Oct. 30, 2019

(86) PCT No.: PCT/US2019/058837
§ 371 (c)(1),
(2) Date: May 1, 2021

(87) PCT Pub. No.: WO2020/092542
PCT Pub. Date: May 7, 2020

(65) Prior Publication Data
US 2022/0007182 A1  Jan. 6, 2022

Related U.S. Application Data

(60) Provisional application No. 62/755,364, filed on Nov. 2, 2018.

(51) Int. Cl.
*H04L 29/06* (2006.01)
*H04W 12/037* (2021.01)
(Continued)

(52) U.S. Cl.
CPC ............. *H04W 12/037* (2021.01); *H04L 9/30* (2013.01); *H04W 12/041* (2021.01);
(Continued)

(58) Field of Classification Search
CPC ............. H04W 12/037; H04W 12/041; H04W 12/0431; H04W 48/10; H04W 74/0833; H04W 84/042; H04L 9/30; H04L 2209/80
See application file for complete search history.

(56) References Cited

U.S. PATENT DOCUMENTS

2009/0144557 A1\* 6/2009 Sutton ..................... H04L 9/088
 713/189
2013/0163762 A1 6/2013 Zhang et al.
(Continued)

FOREIGN PATENT DOCUMENTS

WO  WO-2018137239 A1 \*  8/2018
WO  WO-2020092542 A1 \*  5/2020  .............. H04L 9/30

OTHER PUBLICATIONS

Intel, 'Initial NAS-Discussion on Initial NAS protect ion', S3-183041, 3GPP 1-9,19-20 TSG SA WG3 (Security) Meeting #92 ad-hoc, Harbin (China) Sep. 19, 2018 See sections 3.1, 3.2.2.
(Continued)

*Primary Examiner* — Shawnchoy Rahman
(74) *Attorney, Agent, or Firm* — Kowert, Hood, Munyon, Rankin & Goetzel, P.C.

(57) ABSTRACT

Systems and methods of protecting an initial NAS message are described. The NAS message is encrypted using the home PLMN public key during initial registration with the network using a registration request message. An AMF of the serving PLMN sends a serving PLMN public key which is then used to encrypt information including an S-NSSAI of later initial NAS messages after initial registration is completed. The S-NSSAI may not be sent in the later initial NAS
(Continued)

message if the S-NSSAI is provided at an access stratum level. The RRC message may contain an indication that the S-NSSAI is encrypted using the serving PLMN public key.

19 Claims, 7 Drawing Sheets

(51) Int. Cl.
*H04W 12/0431* (2021.01)
*H04W 12/041* (2021.01)
*H04L 9/30* (2006.01)
*H04W 48/10* (2009.01)
*H04W 74/08* (2009.01)
*H04W 84/04* (2009.01)

(52) U.S. Cl.
CPC ....... *H04W 12/0431* (2021.01); *H04W 48/10* (2013.01); *H04L 2209/80* (2013.01); *H04W 74/0833* (2013.01); *H04W 84/042* (2013.01)

(56) References Cited

U.S. PATENT DOCUMENTS

| | | | |
|---|---|---|---|
| 2017/0230355 A1* | 8/2017 | Su | H04L 63/0435 |
| 2020/0145818 A1* | 5/2020 | Lee | H04W 12/037 |
| 2021/0195509 A1* | 6/2021 | Ohlsson | H04W 48/18 |
| 2023/0037090 A1* | 2/2023 | Wang | H04W 52/08 |

OTHER PUBLICATIONS

NTT Docomo, 'Output of evening session on initial NAS security', S3-183174, 1-9,19-20 3GPP TSG SA WG3 (Security) Meeting #92 ad-hoc, Harbin (China) Oct. 3, 2018 See pp. 1-2.
3GPP TS 23.502 V15.3.0, '3GPP; TSG SA; Procedures for the 5G System; 1-20 Stage 2 (Release 15)', Sep. 17, 2018 See sections 4.2-4.2.2.
3GPP TS 33.501 V15.2.0, '3GPP; TSG SA; Security architecture and procedures 1-20 for 5G system (Release 15)', Sep. 21, 2018 See sections C.3.2-C.3.3.

* cited by examiner

PROTECTION OF INITIAL NON-ACCESS STRATUM PROTOCOL MESSAGE IN 5G SYSTEMS

This application is a U.S. National Stage filing of International Application No. PCT/US2019/058837, filed Oct. 30, 2019, titled "Protection of Initial Non-Access Stratum Protocol Message in 5G Systems," which claims the benefit of priority to U.S. Provisional Patent Application Ser. No. 62/755,364, filed Nov. 2, 2018, each of which is incorporated herein by reference in its entirety.

TECHNICAL FIELD

Embodiments pertain to radio access networks (RANs). Some embodiments relate to cellular networks, including Third Generation Partnership Project (3GPP) Long Term Evolution (LTE), $4^{th}$ generation (4G) and $5^{th}$ generation (5G) New Radio (NR) (or next generation (NG)) networks. Some embodiments relate to non-access stratum (NAS) messages in 5G systems.

BACKGROUND

The use of various types of systems has increased due to both an increase in the number and types of user equipment (UEs) using network resources as well as the amount of data and bandwidth being used by various applications, such as video streaming, operating on these UEs. Bandwidth, latency, and data rate enhancement may be used to deliver the continuously-increasing demand for network resources. The next generation wireless communication system, 5G or NR, will provide ubiquitous connectivity and access to information, as well as ability to share data, by various users and applications. NR is expected to be a unified framework that targets to meet starkly different and sometimes, conflicting performance criteria and services. In general, NR will evolve based on 3GPP LTE-Advanced technology with additional enhanced radio access technologies (RATs) to enable seamless wireless connectivity solutions. However, as with the advent of any new technology, many issues arise with the introduction and use of such technology. In this case, initial access to the NG radio access network (NG-RAN) may be problematic.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1:
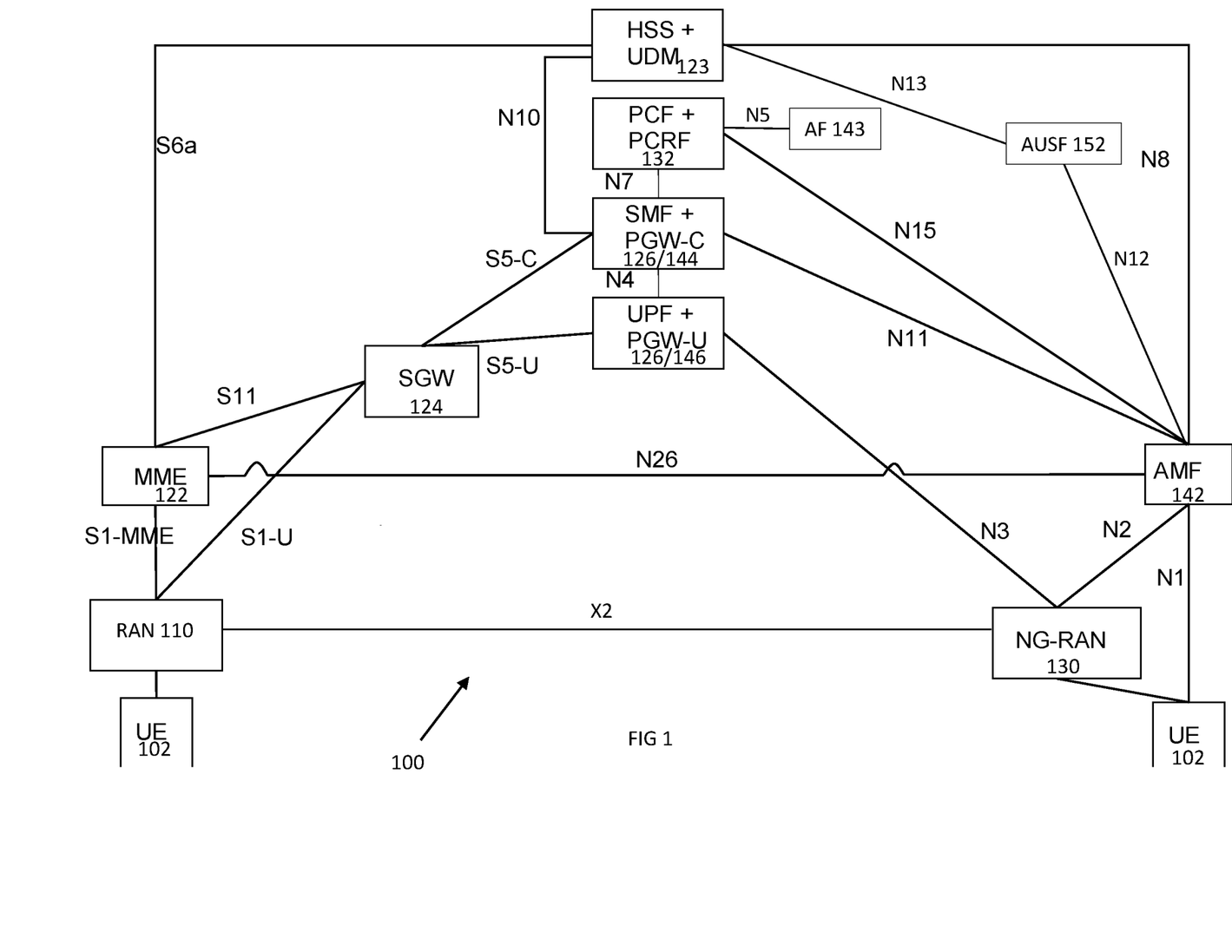
FIG. 1 illustrates combined communication system in accordance with some embodiments.

FIG. 1 illustrates a combined communication system in accordance with some embodiments. The system 100 includes 3GPP LTE/4G and NG network functions. A network function can be implemented as a discrete network element on a dedicated hardware, as a software instance running on dedicated hardware, or as a virtualized function instantiated on an appropriate platform, e.g., dedicated hardware or a cloud infrastructure.

The evolved packet core (EPC) of the LTE/4G network contains protocol and reference points defined for each entity. These core network (CN) entities may include a mobility management entity (MME) 122, serving gateway (S-GW) 124, and paging gateway (P-GW) 126.

In the NG network, the control plane and the user plane may be separated, which may permit independent scaling and distribution of the resources of each plane. The UE 102 may be connected to either an access network or random access network (RAN) 110 and/or may be connected to the NG-RAN 130 (gNB) or an Access and Mobility Function (AMF) 142. The RAN 110 may be an eNB or a general non-3GPP access point, such as that for Wi-Fi. The NG core network may contain multiple network functions besides the AMF 112. The UE 102 may generate, encode and perhaps encrypt uplink transmissions to, and decode (and decrypt) downlink transmissions from, the RAN 110 and/or gNB 130 (with the reverse being true by the RAN 110/gNB 130).

The network functions may include a User Plane Function (UPF) 146, a Session Management Function (SMF) 144, a Policy Control Function (PCF) 132, an Application Function (AF) 148, an Authentication Server Function (AUSF) 152 and User Data Management (UDM) 128. The various elements are connected by the NG reference points shown in FIG. 1.

The AMF 142 may provide UE-based authentication, authorization, mobility management, etc. The AMF 142 may be independent of the access technologies. The SMF 144 may be responsible for session management and allocation of IP addresses to the UE 102. The SMF 144 may also select and control the UPF 146 for data transfer. The SMF 144 may be associated with a single session of the UE 102 or multiple sessions of the UE 102. This is to say that the UE 102 may have multiple 5G sessions. Different SMFs may be allocated to each session. The use of different SMFs may permit each session to be individually managed. As a consequence, the functionalities of each session may be independent of each other. The UPF 126 may be connected with a data network, with which the UE 102 may communicate, the UE 102 transmitting uplink data to or receiving downlink data from the data network.

The AF 148 may provide information on the packet flow to the PCF 132 responsible for policy control to support a desired QoS. The PCF 132 may set mobility and session management policies for the UE 102. To this end, the PCF 132 may use the packet flow information to determine the appropriate policies for proper operation of the AMF 142 and SMF 144. The AUSF 152 may store data for UE authentication. The UDM 128 may similarly store the UE subscription data.

The gNB 130 may be a standalone gNB or a non-standalone gNB, e.g., operating in Dual Connectivity (DC) mode as a booster controlled by the eNB 110 through an X2 or Xn interface. At least some of functionality of the EPC and the NG CN may be shared (alternatively, separate components may be used for each of the combined component shown). The eNB 110 may be connected with an MME 122 of the EPC through an S1 interface and with a SGW 124 of the EPC 120 through an S1-U interface. The MME 122 may be connected with an HSS 128 through an S6a interface while the UDM is connected to the AMF 142 through the N8 interface. The SGW 124 may connected with the PGW 126 through an S5 interface (control plane PGW-C through S5-C and user plane PGW-U through S5-U). The PGW 126 may serve as an IP anchor for data through the internet.

The NG CN, as above, may contain an AMF 142, SMF 144 and UPF 146, among others. The eNB 110 and gNB 130 may communicate data with the SGW 124 of the EPC 120 and the UPF 146 of the NG CN. The MME 122 and the AMF 142 may be connected via the N26 interface to provide control information there between, if the N26 interface is supported by the EPC 120. In some embodiments, when the gNB 130 is a standalone gNB, the 5G CN and the EPC 120 may be connected via the N26 interface.

Figure 2:
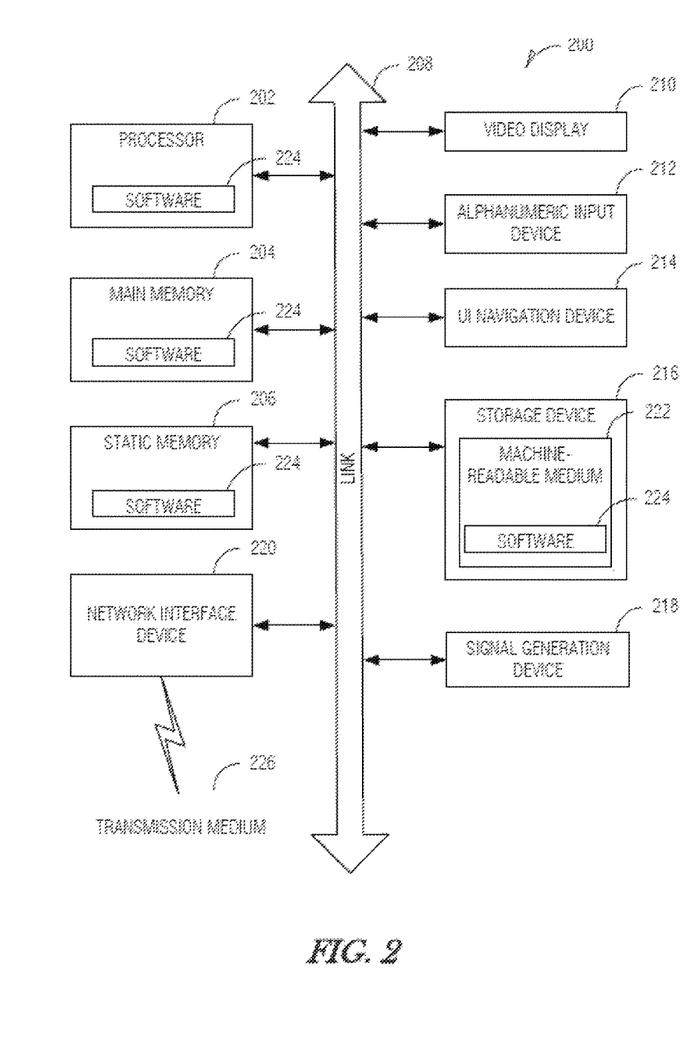
FIG. 2 illustrates a block diagram of a communication device in accordance with some embodiments.

FIG. 2 illustrates a block diagram of a communication device in accordance with some embodiments. In some embodiments, the communication device may be a UE (including an IoT device and NB-IoT device), eNB, gNB or other equipment used in the network environment. For example, the communication device 200 may be a specialized computer, a personal or laptop computer (PC), a tablet PC, a mobile telephone, a smart phone, a network router, switch or bridge, or any machine capable of executing instructions (sequential or otherwise) that specify actions to be taken by that machine. In some embodiments, the communication device 200 may be embedded within other, non-communication based devices such as vehicles and appliances.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, successfully or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a NG/NR standards among others. In an example, the network interface device 220 may include one or more physical jacks (e.g., Ethernet, coaxial, or phone jacks) or one or more antennas to connect to the transmission medium 226.

The communication device 200 may be an IoT device (also referred to as a "Machine-Type Communication device" or "MTC device"), a narrowband IoT (NB-IoT) device, or a non-IoT device (e.g., smart phone, vehicular UE), any which may communicate with the core network via the eNB or gNB shown in FIG. 1. The communication device 200 may be an autonomous or semiautonomous device that performs one or more functions, such as sensing or control, among others, in communication with other communication devices and a wider network, such as the Internet. If the communication device 200 is IoT device, in some embodiments, the communication device 200 may be limited in memory, size, or functionality, allowing larger numbers to be deployed for a similar cost to smaller numbers of larger devices. The communication device 200 may, in some embodiments, be a virtual device, such as an application on a smart phone or other computing device.

As above, to transition from an Idle state to a Connected state with the 5G system, the UE may send an initial NAS message to the AMF. Depending on the context, the initial NAS message may be one of three NAS messages: a registration request, a service request, or a deregistration request. The registration request may be sent to register the UE with the 5G network, for example, during initial registration of the UE with the network, for a mobility registration update, or as part of a periodic registration update. The service request may start the establishment of an NAS signalling connection. The deregistration request may be sent to deregister the UE from the 5G network.

Figure 3:
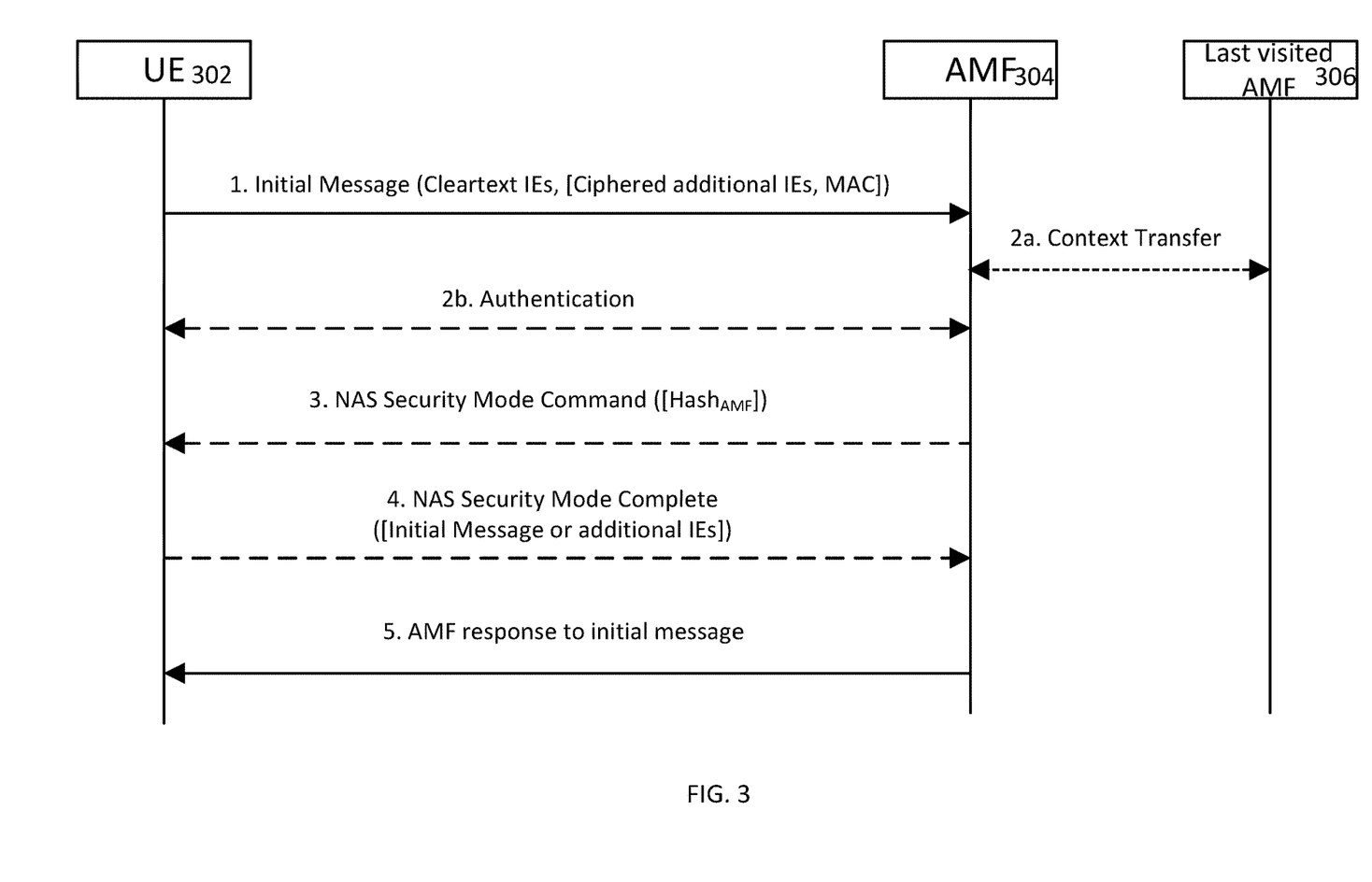
FIG. 3 illustrates an example of initial NAS message transmission in accordance with some embodiments.

FIG. 3 illustrates an example of initial NAS message transmission in accordance with some embodiments. FIG. 3 also illustrates the security mechanisms for the protection of NAS signalling and data between the UE 302 and the AMF 304 over the N1 reference point. The security mechanisms involve both integrity and confidentiality protection.

As indicated in the first operation in FIG. 3, an initial NAS message is the first NAS message that is sent after the UE 302 transitions from the idle state. The UE 302 sends a limited set of information elements (IEs) that are called cleartext IEs in the first NAS message. The cleartext IEs may include IEs used to establish security and/or enable the selection of the AMF 304 in the initial message when the UE 302 has no NAS security context. In this case, the UE 302 may include additional IEs in a NAS Security Mode Complete message to provide ciphering protection of the IEs. When the UE 302 has a security context, the UE 302 may send a complete initial message that is integrity protected with the cleartext IEs unciphered. The cleartext IEs may include IEs used to allow the AMF 304 to verify the message, establish security and/or enable the selection of the AMF 304. The UE 302 may send all other IEs ciphered. The AMF 304 may use a hash value to protect the integrity of the unciphered IEs in case no security context is present in the UE 302 or the check of the integrity protection fails at the AMF 304.

Thus, as shown in FIG. 3, the UE 302 may send the Initial NAS message to the AMF 304 at step 1. If the UE 302 has no NAS security context, the Initial NAS message may contain only the cleartext IEs. The cleartext IEs may include subscription identifiers (e.g., Subscription Concealed Identifier (SUCI) or Globally Unique Temporary UE Identity (GUTI) assigned by the network during a previous session), UE security capabilities, Single Network Slice Selection Assistance Information (S-NSSAI), Key Set Identifier for Next Generation Radio Access Network (ngKSI), the last visited Tracking Area Identifiers (TAIs), an indication that the UE 302 is moving from an EPC and an IE containing the TAU Request in the case of idle mobility from a 4G network. The UE 302 may not have a security context typically when the Initial NAS message is used as a registration request during Initial Registration by the UE 302 with the AMF 304.

For completeness, when the initial NAS message is a Registration Request message, the cleartext IEs are: Extended protocol discriminator; Security header type; Spare half octet; Registration request message identity; 5GS registration type; ngKSI; 5GS mobile identity; UE security capability; Additional GUTI; UE status; and EPS NAS message container. When the initial NAS message is a Service Request message, the cleartext IEs are: Extended protocol discriminator; Security header type; Spare half octet; ngKSI; Service request message identity; Service type; and 5G-S-TMSI.

If the UE 302 has a NAS security context, the initial message may contain the complete message using partial encryption. In this case, the information above may be sent in cleartext but the rest of the message (the remaining IEs) may be ciphered. With a NAS security context, the initial message may also be integrity protected. If the initial message was protected, the AMF 304 may have the same security context and successfully check the integrity. In this case, steps 2 to 4 may be omitted. The UE 302 may have a security context when, for example, the Initial NAS message is used as a registration request during periodic registration or a service request.

If the AMF 304 does not have the security context, as determined by the AMF 304 in a communication with a last visited AMF 306 that was last visited by the UE 302 at step 2a, then the AMF 304 may, at step 2b initiate an authentication procedure with the UE 302. The AMF 304 may also initiate an authentication procedure with the UE 302 if the integrity check fails.

After successful authentication of the UE 302, the AMF 304 may send a NAS Security Mode Command message at step 3. If the Initial message was sent without integrity protection or the integrity protection did not pass (due either to a MAC failure or the AMF 304 not being able to find the used security context), the AMF 304 may include a hash of the Initial NAS message in the NAS Security Mode Complete message. If the AMF 304 did not receive the additional IEs from step 1, either due to the additional IEs not being included or because the AMF 304 could not decrypt the IE, then the AMF 304 may include the hash of the Initial NAS message in the NAS Security Mode Command message.

The UE 302 may send, at step 4, a NAS Security Mode Complete message to the network in response to reception of the NAS Security Mode Command message. The NAS Security Mode Complete message may be ciphered and integrity protected. The NAS Security Mode Complete message may include the complete Initial NAS message if the check of the hash failed. In this case, the AMF 304 may treat the NAS Security Mode Complete message as the initial NAS message to respond to. Otherwise, the NAS Security Mode Complete message may contain the additional IEs in the NAS Security Mode Command message if the UE 302 succeeds in checking the hash. In this case, the AMF 304 may use the cleartext IEs from step 1 and the additional IEs from step 4 as the initial NAS message to respond to.

At step 5 the AMF 304 may send its response to the Initial NAS message. This message may be ciphered and integrity protected.

As above, there are thus two cases: the UE does not have a security context (e.g., a Registration Request during Initial Registration) or the UE has a security context (e.g., a Registration Request during Periodic Registration or a Service Request). In the former case, the Initial NAS message may contain only "clear text" parameters, while in the latter case the Initial NAS messages may contain some parameters that are sent as "clear text IEs" and some parameters that are sent ciphered ("remaining IEs"). However, in the message exchange shown in FIG. 3, a relatively large number of parameters carrying sensitive information may be sent in the clear. These parameters may allow, for example, tracking of the UE.

To further improve the security of the Initial NAS message, in some embodiments, the serving Public Land Mobile Network (PLMN) network may advertise a public key via the System Information Block (SIB). Alternatively, or in addition, the serving PLMN network may send the public key via dedicated NAS signaling after transmission of the registration request (such as in a Registration Accept Message). The UE may use the public key to encrypt parts of the Initial NAS message (Registration Request, Service Request or Deregistration Request). Every AMF in the serving PLMN may know the corresponding private key that is used to decrypt the Initial NAS message. The public key may be broadcast, rather than unicast or multicast, in a cell or provided on request. A UE may request the public key as with other on-demand SIBs using a dedicated RACH resource or using RACH message 3 (RRCConnectionResumeRequest message) to request the public key.

By using public key encryption, the Initial NAS message may be provided with more complete security and security attacks (e.g., tracking) may be prevented. In addition, problems associated with "passive" attackers, such as those who just eavesdrop on radio signals may be mitigated. Furthermore, the embodiments herein allow for even the UE identity (e.g., the 5G-GUTI) to be encrypted.

In some embodiments, the serving PLMN network may advertise a public key via the SIB. The UE may use the public key to encrypt parts of the Initial NAS message (Registration Request, Service Request or Deregistration Request) before transmission at step 1 of FIG. 3. Additionally, every AMF in the serving PLMN may know the corresponding private key that is used to decrypt the Initial NAS message. The portion of the Initial NAS message that is encrypted using the public key can, in some embodiments, include the whole message, while in other embodiments, the only a subset of the Initial NAS message may be encrypted. In the latter case, for example, some or all of the cleartext IEs of the Initial NAS message may be encrypted (or ciphered) using the public key, rather than being sent in cleartext.

When the UE has security context, the cleartext IEs may be ciphered using the public key while the remaining IEs can be protected using the existing partial ciphering mechanism using the encryption key from the NAS security context. The initial NAS message may also contain a Nonce, a timestamp, or a sequence number so that the outcome of the public key encryption changes regularly. This may be used to prevent replay attacks, for example. The Nonce itself may belong to the cleartext IEs.

The advertised public key may be changed from time to time. The frequency for public key change may be set by the operator (network). During the transition time (i.e., when the new public key is being distributed to all Core Network (CN) and Radio Access Network (RAN) nodes), the network may accept Initial NAS messages that are encrypted with either the old public key or the new public key to avoid unnecessary rejections of UE requests.

An "active" attacker (e.g., a rogue base station) would advertise a public key that is different from the one advertised by other base stations to be able to decrypt the Initial NAS message of the "victim" UE. If the UE is able to read the SIB from multiple adjacent cells, the UE may be able to identify the rogue base station by merely comparing the advertised public keys and realizing that one of them is different from the others. The UE may then report the rogue base station to the real network after registration with the real network.

Such an embodiment can also be used to encrypt the RRC message carrying the Initial NAS message. This would allow confidentiality for parameters that are signalled as cleartext at RRC level (e.g., the NSSAI). If so, the RAN nodes would also know the private key. Note that the public key used at RRC level may or may not be the same as the public key used at NAS level, however, they both may be advertised via SIB.

In some embodiments rather than broadcasting the public key as above, the UE may be configured with the home PLMN operator's public key for encrypting the 5G subscription permanent identifier (SUPI) of the UE. The Home PLMN operator's public key may be used for protection of the Initial NAS message for Initial Registration. In this case, the Serving PLMN network may send the Serving PLMN operator's public key via dedicated NAS signaling during Initial Registration (e.g., in a Registration Accept message) or after Initial Registration. The Serving PLMN operator's public key may be used for protection of the Initial NAS message protection for subsequent network access (i.e., other than Initial Registration).

In the Initial NAS message during Initial Registration (i.e., prior to any security context between the UE and serving network), the UE may use the home PLMN public key (used for generating the SUCI) to encrypt the entire NAS message payload included in the Registration Request message. The UE may use the SUCI as the mobile identity (subscription identifier). Other information (cleartext IEs or remaining IEs) in the Initial NAS message may be included encrypted in a separate part of the Initial NAS message.

Upon receipt of Initial NAS message for the Initial registration, the AMF in the Serving network may send SUCI+Encrypted NAS message to the home network. Home operator may decrypt the SUCI to extract SUPI as specified in TS 33.501, and furthermore may also decrypt NAS message payload. Home operator may then send the SUPI and decrypted NAS message payload to the AMF in the serving network.

Upon successful authentication, the AMF in the serving network may send its public key to the UE in the SMC command. Additionally, the AMF may include the public keys of equivalent PLMNs. An example for an equivalent PLMN could be, for example, a PLMN in the neighborhood where the UE may attempt to register via a Mobility Registration Update instead of an Initial Registration. If the UE receives AMF's public key in the SMC command, the UE may encrypt subsequent initial NAS messages to AMF using the AMF public key.

In another embodiment, the UE may be configured with the Home PLMN operator's public key used for encrypting the SUPI. The Home PLMN operator's public key may be used for protection of the Initial NAS message for Initial Registration. In this case, the Serving PLMN network may send the Serving PLMN operator's public key via dedicated NAS signaling during or after Initial Registration. The UE may provide network slice selection information (e.g. the requested S-NSSAI) in the initial RRC message (MSG5) used by the RAN for AMF selection. According to current 3GPP specifications the NSSAI information is to be sent as clear text because MSG5 is sent before the installment of the UE context (including security) in the RAN. Sending the S-NSSAI in clear text IE as part of Initial RRC message may, however, raise privacy concerns.

Upon successful authentication, the AMF in the serving network may send the public key of the Serving PLMN to the UE via dedicated NAS signaling (e.g., in the SMC command). Additionally, the AMF may include the public keys of equivalent PLMNs. An example for an equivalent PLMN may be, e.g., a PLMN in the neighborhood where the UE will attempt to register via a Mobility Registration Update instead of an initial Registration. The equivalent PLMN may thus be a geographically proximate PLMN to that of the serving PLMN. The equivalent PLMN may be provided by the same or a different operator than the serving PLMN.

If the UE receives the Serving PLMN's public key from the AMF via dedicated NAS signaling, the UE may use this public key to encrypt selected information (e.g., NSSAI information) in subsequent initial RRC messages (MSG5) carrying the Initial NAS message. In some instances, the UE may be configured to provide the S-NSSAI to the gNB at the access stratum level. If the S-NSSAI is provided to the gNB at the access stratum level, the S-NSSAI may be provided from the gNB to the AMF in the NAS stratum level in N2 signaling. In addition, the UE may avoid also including the S-NSSAI in the Initial NAS message as the S-NSSAI was already provided at the access stratum level.

An indication may be provided by the UE in MSG5 to indicate that the selected information is encrypted using the Serving PLMN's public key.

In another embodiment, the network may broadcast the public key. The public key may, as above, be cell-specific or may cover a wider geographical region (e.g., the gNB, the core network, or larger than that of the core network). This allows the RAN node to handle the keys and decryption of the MSG5 on its own without impacting the CN. Each RAN node may generate its own public key that, as above, may be cell-specific or may cover a wider region. In some embodiments, the RAN nodes may each determine (or the network may indicate to each RAN node) which of cell-specific or a wider region public key to transmit.

To limit the broadcast load, the RAN may not broadcast the keys all the time and instead use an "on-demand" mechanism. In this case, if a UE wants the public key, the UE can request the public key off the network using a RACH procedure. The UE may do so by sending a specific RACH resource, which may be a predetermined preamble and/or transmission on a specific RACH resource. Alternatively, the UE can send a request as part of MSG3 of the RACH procedure or in another control message.

The network, on receipt of this request, may provide the information over dedicated signaling to the UE in response to reception of the request from the UE. Alternatively, or in addition, the network may trigger broadcasting of the public keys by the gNB. The UE may store the key associated with a cell even when the UE moves out of the cell. This permits re-use of the key when the UE returns to the cell (the key may otherwise be deleted). A value tag may be used to inform the UE if the key has changed since the UE last acquired the key for the cell.

Figure 4:
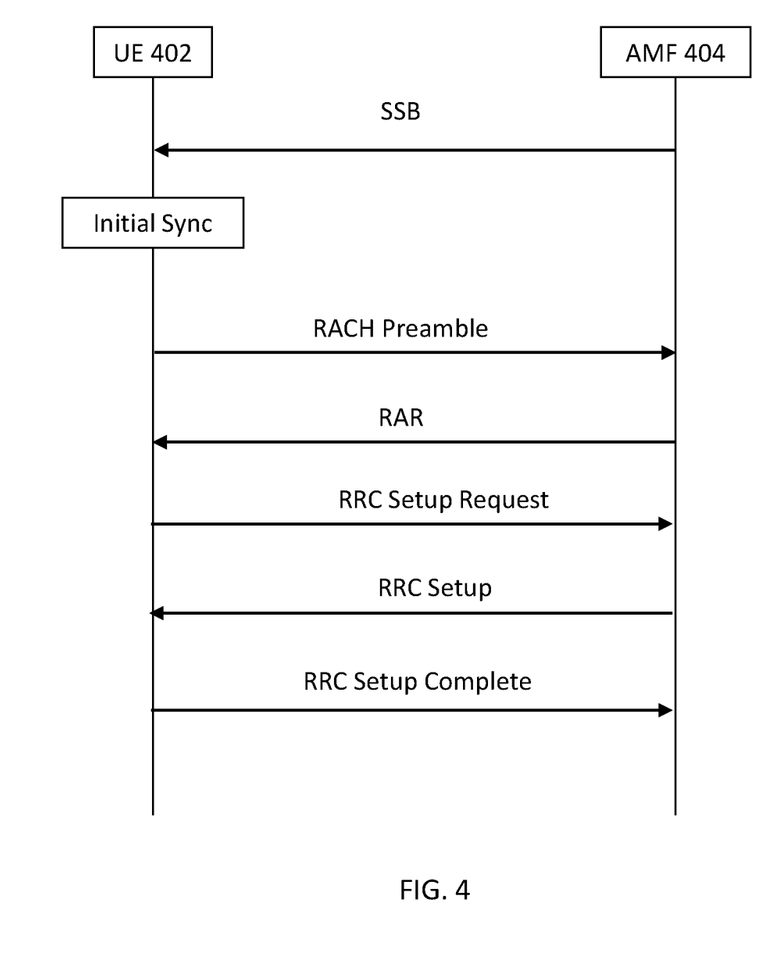
FIG. 4 illustrates an example of a Radio Resource Control (RRC) connection procedure in accordance with some embodiments.

FIG. 4 illustrates an example of a Radio Resource Control (RRC) connection procedure in accordance with some embodiments. During initial acquisition, the UE 402 may perform an initial synchronization by detecting the primary synchronization signal (PSS) and secondary synchronization signal (SSS) of a synchronization signal block (SSB) to obtain the cell identity and frame timing. The PSS may provide slot timing and Physical Layer ID; the SSS may provide the physical layer cell identity group number for Radio Frame Timing detection, Physical Layer Cell ID, cyclic prefix length, FDD or TDD determination.

The UE 402 may then obtain the system information during reception of the physical broadcast channel (PBCH) in the SSB, which may carry the master information block (MIB) and system information blocks (SIBS) of the AMF 404. One of the SIBS, in some embodiments, may include a public key of the AMF 404. The public key may be provided in a SIB already existing in the 3GPP standard or in a new SIB. The UE 402 may also obtain random access procedure configuration information from the PBCH.

After obtaining the random access procedure configuration information, the UE 402 may perform a random access procedure. The random access procedure may include the UE 402 initially transmitting a random access preamble to the AMF 404 using a random access channel (RACH) (Msg-1). The RACH may use the random access Radio Network Temporary Identifier (RA-RNTI) and a selected Preamble Index. The RACH may be sent at the time and frequency location determined from the RACH parameters in SIB2 of the PBCH.

The UE 402 may receive a random access response (RAR) from the AMF 404 in a physical downlink shared channel (PDSCH) (Msg-2). The RAR may include the RA-RNTI, a Cell RNTI (RA-RNTI), a timing adjustment for the UE 402 and an uplink grant.

The UE 402 may then in some embodiments transmit an RRC Connection Request (Msg-3) on an uplink shared channel (UL-SCH) using the resources indicated by the RAR at a timing based on the timing adjustment. In some embodiments, the UE 402 may send an RRC Setup Request (Msg-3) using the UE identity used during contention resolution and an establishment cause. The UE identity may be encrypted using the network key.

The AMF 404 may then respond to the RRC Connection Request by transmitting an RRC Connection Setup message or RRC Setup message (Msg-4) on a downlink shared channel (DL-SCH). The RRC Connection Setup message may include information of the Signaling Radio Bearers (SRBs), Data Radio Bearers (DRBs), and UE-specific configuration.

The UE 402 may in response transmit an RRC Connection Complete message or RRC Setup Complete message on the UL-SCH. The RRC Connection/Setup Complete message may acknowledge reception of the RRC Setup message and provide the AMF 404 with the PLMN ID of the home network of the UE as well as dedicated NAS information. The dedicated NAS information may include the registration (GUAMI) type, 5G-GUTI (SAE-Temporary Mobile Subscriber Identity (S-TMSI)) of the UE, last tracking area identifier (TAI), requested NSSAI, UE capability and list of PDU sessions. At least some of the dedicated NAS information (the cleartext IEs) may be encrypted using the public key of the AMF 404.

Subscription Permanent Identifier

Each subscriber in the 5G System may be allocated one SUPI for use within the 3GPP system. The 5G System may support identification of subscriptions independently of identification of the UE. Each UE accessing the 5G System may also be assigned a Permanent Equipment Identifier (PEI). The 5G System may further support allocation of a temporary identifier (5G-GUTI) to support user confidentiality protection.

A globally unique SUPI may be allocated to each subscriber in the 5G System and provisioned in the UDM/UDR. The SUPI may be used only inside 3GPP system. The SUPI may contain an IMSI or a network-specific identifier, used for private networks. It is possible for a SUPI to take the form of a Network Access Identifier (NAI) using the NAI RFC 7542, for either an international mobile subscriber identity (IMSI)-based or non-IMSI-based (e.g. when used over a non-3GPP Access Technology or for private networks) NAI. To enable roaming scenarios, the SUPI may contain the address of the home network (e.g., the Mobile Country Code (MCC) and Mobile Network Code (MNC) in the case of an IMSI-based SUPI). For interworking with the EPC, the SUPI allocated to the 3GPP UE may be based on an IMSI to enable the UE to present an IMSI to the EPC. The SUPI may be privacy protected over-the-air by using the SUCI described below.

Subscription Concealed Identifier

The SUCI is a privacy preserving identifier containing the concealed SUPI or Mobile Subscriber Identification Number (MSIN). The SUCI may be a one-time use subscription identifier, which contains the concealed subscription identifier, e.g. the MSIN part of SUPI, and additional non-concealed information for home network routing and protection scheme usage. The UE may generate a SUCI using a protection scheme with the raw public key that was securely provisioned in control of the home network. The protection schemes may specified in Annex C or specified by the HPLMN.

The UE may construct a scheme-input from the subscription identifier part of the SUPI, as specified by the protection scheme. The UE may execute the protection scheme with the constructed scheme-input as input and take the output as the scheme-output. The UE may not conceal the home network identifier, e.g. MCC or MNC. The UE may construct the SUCI with the following data fields: the protection scheme identifier that represents a protection scheme specified in Annex C or a protection scheme specified by the HPLMN; the home network public key identifier that represents a public key provisioned by the HPLMN; if a null-scheme is used, this data field may be set to null; the home network identifier; and the scheme-output. The identifier and the format of the scheme output are defined elsewhere. In case non-null schemes, the freshness and randomness of the SUCI may be taken care of by the corresponding SUPI protection schemes.

The UE may include a SUCI only in certain 5G NAS messages. If the UE is sending a Registration Request message of type initial registration to a PLMN for which the UE does not already have a 5G-GUTI, the UE may include a SUCI to the Registration Request message. In addition, if the UE includes a 5G-GUTI when sending a Registration Request message of type re-registration to a PLMN and, in response, receives an Identity Request message, then the UE may include a fresh SUCI in the Identity Response message.

In response to the Identifier Request message, the UE may never send the SUPI. The UE may generate a SUCI using null-scheme only under certain circumstances. The UE may generate a SUCI using null-scheme if the UE is making an unauthenticated emergency session and does not have a 5G-GUTI to the chosen PLMN. In addition, the UE may generate a SUCI using null-scheme if the home network has configured null-scheme to be used. The UE may also generate a SUCI using null-scheme if the home network has not provisioned the public key used to generate a SUCI.

If the operator's decision, indicated by the User Subscriber Identity Module (USIM), is that the USIM may calculate the SUCI, then the USIM may not give the mobile entity (ME) any parameter for the calculation of the SUCI including the home network public key, the home network public key identifier, protection scheme profile, and the protection scheme identifier. If the ME determines that the calculation of the SUCI, indicated by the USIM, may be performed by the USIM, the ME may delete any previously received or locally cached parameters for the calculation of the SUCI including the home network public key, the home network public key identifier, protection scheme profile, and the protection scheme identifier. The operator may use a proprietary identifier for protection schemes if the operator chooses that the calculation of the SUCI is to be done in the USIM.

If the operator's decision is that ME is to calculate the SUCI, the home network operator may provision in the USIM an ordered priority list of the protection scheme identifiers that the operator allows. The priority list of protection scheme identifiers in the USIM may only contain protection scheme identifiers specified in Annex C, and the list may contain one or more protection schemes identifiers. The ME may read the SUCI calculation information from the USIM, including the SUPI, the home network public key, the home network public key identifier, and the list of protection scheme identifiers. The ME may select the protection scheme from its supported schemes that has the highest priority in the list obtained from the USIM. The ME may calculate the SUCI using the null-scheme if the home network public key or the priority list are not provisioned in the USIM.

Note that the protection scheme selected by older MEs may not be the protection scheme with the highest priority in the list of the USIM. The Subscription Identifier De-concealing Function (SIDF) may be responsible for de-concealment of the SUCI. The SIDF is a service offered by UDM in the home network of the subscriber and is responsible for de-concealing the SUPI from the SUCI. The SIDF resolves the SUPI from the SUCI based on the protection scheme used to generate the SUCI. The home network key used for subscriber privacy may be protected from physical attacks in the UDM. When private/public key pair(s) is used for subscriber privacy, the UDM may hold the key identifier(s). The algorithm used for subscriber privacy may be executed in the secure environment of the UDM.

Permanent Equipment Identifier

A Permanent Equipment Identifier (PEI) may be defined for the 3GPP UE accessing the 5G System. The PEI can assume different formats for different UE types and use cases. The UE may present the PEI to the network together with an indication of the PEI format being used. If the UE supports at least one 3GPP access technology, the UE may be allocated a PEI in the IMEI format.

5G Globally Unique Temporary Identifier

The AMF may allocate a 5G-GUTI to the UE that is common to both 3GPP and non-3GPP access. It is possible to use the same 5G-GUTI for accessing 3GPP access and non-3GPP access security context within the AMF for the given UE. An AMF may re-assign a new 5G-GUTI to the UE at any time. The AMF may delay updating the UE with its new 5G-GUTI until the next NAS transaction.

The 5G-GUTI may be structured as:

<5G-GUTI>:=<GUAMI><5G-TMSI> where GUAMI identifies one or more AMF(s). When the GUAMI identifies only one AMF, the 5G-TMSI may identify the UE uniquely within the AMF. However, when AMF assigns a 5G-GUTI to the UE with a GUAMI value used by more than one AMF, the AMF may ensure that the 5G-TMSI value used within the assigned 5G-GUTI is not already in use by the other AMF(s) sharing that GUAMI value.

The Globally Unique AMF ID (GUAMI) may be structured as:

<GUAMI>:=<MCC><MNC><AMF Region ID><AMF Set ID><AMF Pointer> where AMF Region ID identifies the region, the AMF Set ID uniquely identifies the AMF Set within the AMF Region and AMF Pointer identifies one or more AMFs within the AMF Set. The AMF Region ID addresses the case that there are more AMFs in the network than the number of AMFs that can be supported by AMF Set ID and AMF Pointer by enabling operators to re-use the same AMF Set IDs and AMF Pointers in different regions. The 5G-S-TMSI is the shortened form of the GUTI to enable more efficient radio signalling procedures (e.g., during Paging and Service Request) and is defined as:

<5G-S-TMSI>:=<AMF Set ID><AMF Pointer><5G-TMSI>

NAS Security Mode Command Procedure

Figure 5:
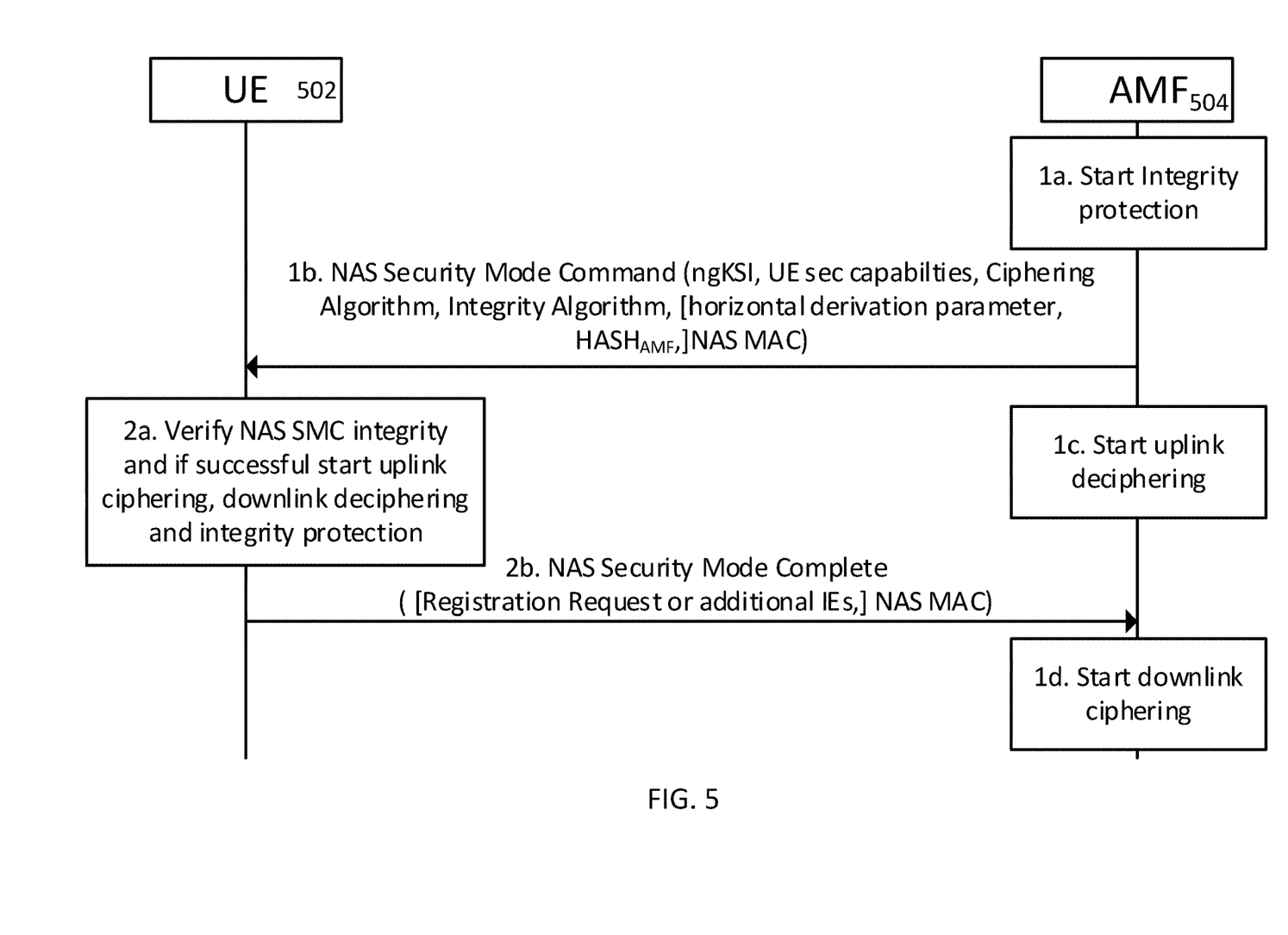
FIG. 5 illustrates an example of an NAS Security Mode Command (SMC) procedure in accordance with some embodiments.

FIG. 5 illustrates an example of an NAS Security Mode Command (SMC) procedure in accordance with some embodiments. The NAS Security Mode Command (SMC) procedure is may be used to establish NAS Security context between the UE and the AMF. This procedure may include a roundtrip of messages between the AMF and the UE. The AMF may send the NAS Security Mode Command message to the UE and the UE may reply with the NAS Security Mode Complete message.

The NAS SMC procedure may be designed such that it protects the Registration Request against a man-in-the-middle attack in which the attacker modifies the IEs containing the UE security capabilities provided by the UE in the Registration Request. It works as follows: if the method completes successfully, the UE is attached to the network knowing that no bidding down attack has happened. In case a bidding down attack was attempted, the verification of the NAS SMC will fail and the UE may reply with a reject message meaning that the UE will not attach to the network.

As shown, at step 1a. the AMF 504 may activate the NAS integrity protection before sending the NAS Security Mode Command message. At step 1b. the AMF 504 may send the NAS Security Mode Command message to the UE 502. The NAS Security Mode Command message may contain: the replayed UE security capabilities, the selected NAS algorithms, and the ngKSI for identifying the $K_{AMF}$. The NAS Security Mode Command message may contain the horizontal derivation parameter, $HASH_{AMF}$ and the Anti-Bidding down Between Architectures (ABBA) parameter. If a horizontal derivation of $K_{AMF}$ during mobility registration update or during multiple registration in same PLMN, the horizontal derivation parameter may be included in the NAS Security Mode Command message as described in clause 6.9.3 of TS 33.501.

The inclusion of $HASH_{AMF}$ is described in clause 6.4.6 of TS 33.501. The AMF may calculate a $HASH_{AMF}$ as described in Annex H.2. This message may be integrity protected (but not ciphered) with NAS integrity key based on the $K_{AMF}$ indicated by the ngKSI in the NAS Security Mode Command message (see FIG. 6.7.2-1). NAS uplink deciphering at the AMF 504 with this context may start after sending the NAS Security Mode Command message.

If the network supports interworking using the N26 interface between MME and AMF, the AMF may also include the selected EPS NAS algorithms (defined in Annex B of TS 33.501) to be used after mobility to EPS in the NAS Security Mode Command message (see clause 8.5.2). The UE may store the algorithms for use after mobility to EPS using the N26 interface between MME and AMF. The AMF may store the selected EPS algorithms in the UE security context.

This message may be integrity protected (but not ciphered) with NAS integrity key derived from the $K_{AMF}$ indicated by the ngKSI in the NAS Security Mode Command message.

At step 1c, the AMF 504 may activate NAS uplink deciphering after sending the NAS Security Mode Command message.

At step 2a, the UE 502 may verify the NAS Security Mode Command message. This may include checking that the UE security capabilities sent by the AMF 504 match the ones stored in the UE 502 to ensure that these were not modified by an attacker and to verify the integrity protection using the indicated NAS integrity algorithm and the NAS integrity key based on the $K_{AMF}$ indicated by the ngKSI.

If the NAS Security Mode Command message includes a $HASH_{AMF}$, the UE 502 may calculate $HASH_{UE}$ from the entire initial NAS message that the UE 502 has sent and compare the $HASH_{UE}$ against $HASH_{AMF}$. The UE 502 may calculate $HASH_{UE}$. The UE 502 may calculate the $HASH_{UE}$ after the UE 502 sends the Registration Request and before the UE 502 receives the NAS Security Mode Command message. Alternatively, the UE 502 may calculate the $HASH_{UE}$ after successfully verifying a NAS Security Mode Command message that includes a $HASH_{AMF}$. If the NAS Security Mode Command message includes a horizontal derivation parameter, the UE 502 may derive a new $K_{AMF}$ as described in Annex A.13 and set the NAS COUNTs to zero. If the verification of the integrity of the NAS Security Mode Command message is successful, the UE 502 may start NAS integrity protection and ciphering/deciphering with the security context indicated by the ngKSI.

At step 2b, the UE 502 may send the ciphered and integrity protected NAS Security Mode Complete message to the AMF 504. The NAS Security Mode Complete message may include PEI if requested by the AMF 504 in the NAS Security Mode Command message. The handling of HASH$_{AMF}$ is described in clause 6.4. The AMF 504 may set the NAS COUNTs to zero if horizontal derivation of K$_{AMF}$ is performed.

If the verification of the NAS Security Mode Command message is not successful in the UE 502, the UE 502 may reply with a NAS Security Mode Reject message (see TS 24.501). The NAS Security Mode Reject message and all subsequent NAS messages may be protected with the previous, if any, 5G NAS security context, i.e., the 5G NAS security context used prior to the failed NAS Security Mode Command message. If no 5G NAS security context existed prior to the NAS Security Mode Command message, the NAS Security Mode Reject message may remain unprotected.

A failed hash comparison may not affect the security establishment as the UE 502 has still checked the UE security capabilities sent by the AMF 504 in the NAS Security Mode Command message. The AMF 504 may de-cipher and check the integrity protection on the NAS Security Mode Complete message using the key and algorithm indicated in the NAS Security Mode Command message. NAS downlink ciphering at the AMF 504 with this security context may start after receiving the NAS Security Mode Complete message. If the AMF 504 has sent HASH$_{AMF}$ in step 1b, the AMF 504 may perform as described in clause 6.4.6.

At step 1d, the AMF 504 may activate NAS downlink deciphering. If the uplink NAS COUNT will wrap around by sending the NAS Security Mode Reject message, the UE 502 may release the NAS connection instead of sending the NAS Security Mode Reject message.

Elliptic Curve Integrated Encryption Scheme (ECIES)

Figure 6:
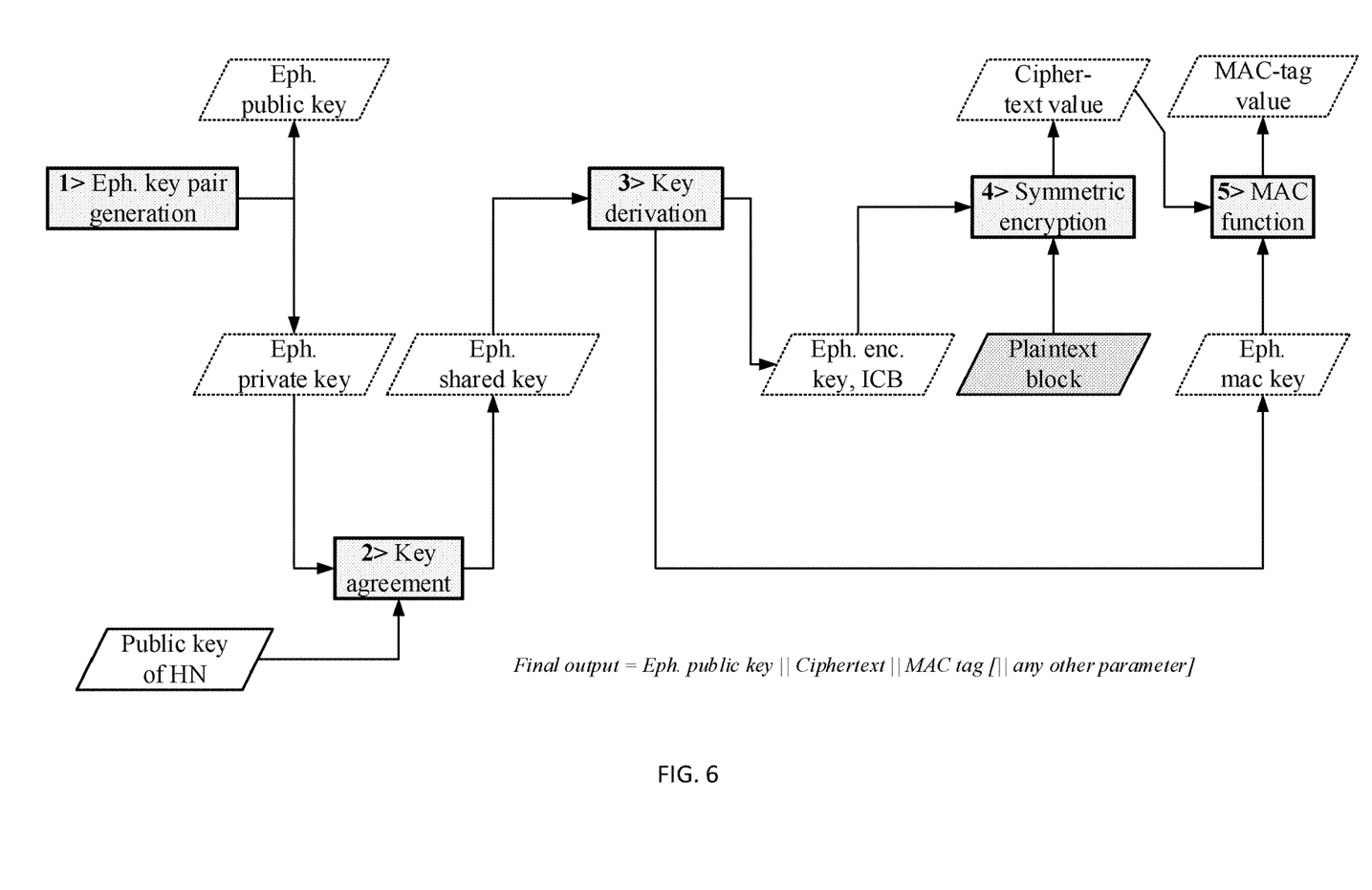
FIG. 6 illustrates an example of encryption at the UE in accordance with some embodiments.
Figure 7:
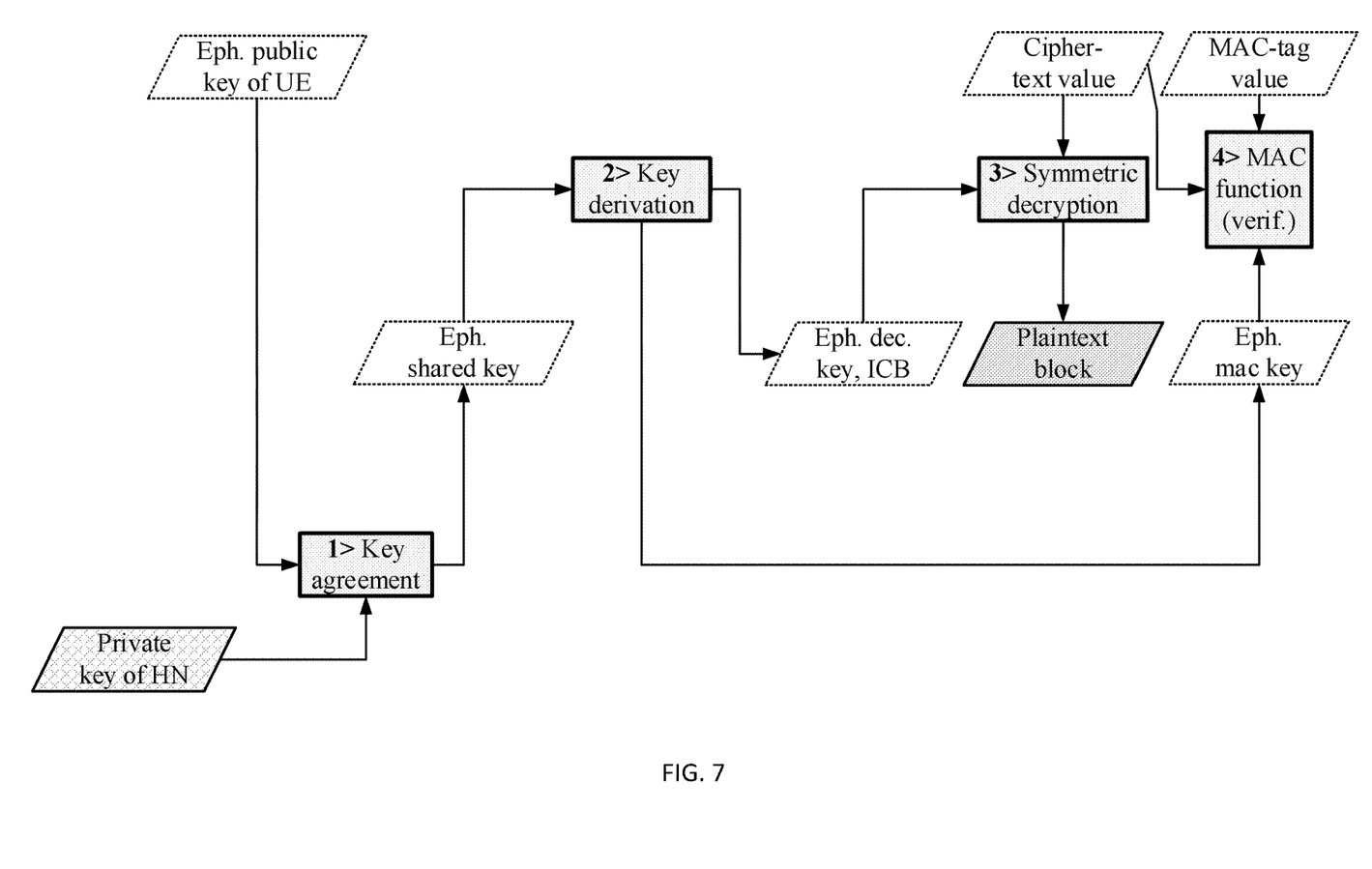
FIG. 7 illustrates an example of decryption at the UE in accordance with some embodiments.

FIG. 6 illustrates an example of encryption at the UE in accordance with some embodiments. FIG. 6 similarly illustrates an example of decryption at the UE in accordance with some embodiments. In particular, FIG. 6 illustrates the use of ECIES for concealment of the SUPI to adhere to the SECG specifications, while FIG. 7 illustrates ECIES decryption. Processing on UE side and home network side are described below.

Processing on UE Side

The ECIES scheme may be implemented such that for computing a fresh SUCI, the UE may use the provisioned public key of the home network and freshly generated elliptic curve cryptography (ECC) ephemeral public/private key pair according to the ECIES parameters provisioned by home network. The processing on UE side may be done according to the encryption operation defined by SECG SEC 1: Recommended Elliptic Curve Cryptography, Version 2.0, 2009. Available http://www.secg.org/sec1-v2.pdf (which is incorporated herein by reference in its entirety, and hereinafter "SECG SEC 1 v2") with the following changes to Section 3.8 and step 5 and 6 of Section 5.1.3.

As indicated, keying data K of length enckeylen+icblen+mackeylen may be generated. The leftmost enckeylen octets of K may be parsed as an encryption key (EK), the middle icblen octets of K as an initial counter block (ICB), and the rightmost mackeylen octets of K as a MAC key (MK). The final output may be the concatenation of the ECC ephemeral public key, the ciphertext value, the MAC tag value, and any other parameters, if applicable. In some cases other parameters may be used to enable the sender to send an additional sign indication when point compression is used.

ECIES Profiles

Unless otherwise stated, the ECIES profiles follow the terminology and processing specified in SECG SEC 1 v2. The profiles are to use named curves over prime fields.

For generating successive counter blocks from the ICB in control (CTR) mode, the profiles may use the standard incrementing function in section B.1 of NIST Special Publication 800-38A with m=32 bits. The ICB corresponds to T$_1$.

Profile A may use its own standardized processing for key generation (section 6 of RFC 7748) and shared secret calculation (section 5 of RFC 7748). The Diffie-Hellman primitive X25519 (section 5 of RFC 7748) takes two random octet strings as input, decodes them as scalar and coordinate, performs multiplication, and encodes the result as an octet string. The shared secret output octet string from X25519 may be used as the input Z in the ECIES KDF (section 3.6.1 of SECG SEC 1 v2).

Profile B may use point compression to save overhead and may use the Elliptic Curve Cofactor Diffie-Hellman Primitive (section 3.3.2 of SECG SEC 1 v2) to enable future addition of profiles with cofactor h≠1. For curves with cofactor h=1 the two primitives (section 3.3.1 and 3.3.2 of SECG SEC 1 v2) may be equal. The profiles may not use backwards compatibility mode (therefore are not compatible with version 1 of SECG).

Profile A

The ME and SIDF may implement this profile. The ECIES parameters for this profile may be the following:

| | |
|---|---|
| EC domain parameters | Curve25519 |
| EC Diffie-Hellman primitive | X25519 |
| point compression | N/A |
| KDF | ANSI-X9.63-KDF |
| Hash | SHA-256 |
| SharedInfo$_1$ | R̄(the ephemeral public key octet string) |
| MAC | HMAC-SHA-256 |
| mackeylen | 32 octets (256 bits) |
| maclen | 8 octets (64 bits) |
| SharedInfo$_2$ | the empty string |
| ENC | AES-128 in CTR mode |
| enckeylen | 16 octets (128 bits) |
| icblen | 16 octets (128 bits) |
| backwards compatibility mode | false |

Profile B

The ME and SIDF may implement this profile. The ECIES parameters for this profile may be the following:

| | |
|---|---|
| EC domain parameters | secp256r1 |
| EC Diffie-Hellman primitive | Elliptic Curve Cofactor Diffie-Hellman Primitive |
| point compression | true |
| KDF | ANSI-X9.63-KDF |
| Hash | SHA-256 |
| SharedInfo1 | R̄ (the ephemeral public key octet string) |
| MAC | HMAC-SHA-256 |
| mackeylen | 32 octets (256 bits) |
| maclen | 8 octets (64 bits) |
| SharedInfo2 | the empty string |
| ENC | AES-128 in CTR mode |
| enckeylen | 16 octets (128 bits) |
| icblen | 16 octets (128 bits) |
| backwards compatibility mode | false |

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus, the following claims are hereby incorporated into the Detailed Description, with each claim standing on its own as a separate aspect.

What is claimed is:

1. An apparatus comprising:
a memory configured to store a public key; and
processing circuitry configured to:
  determine whether a request for the public key has been received from a user equipment (UE);
  generate, in response to reception of the request, a transmission comprising the public key;
  decode, after transmission of the public key, an initial radio resource control (RRC) message from the UE, the initial RRC message comprising an initial non-access stratum (NAS) message, the initial NAS message comprising Network Slice Selection Assistance Information (NSSAI) encrypted using the public key; and
  decrypt the NSSAI prior to communicating the NSSAI to a core network associated with the apparatus.

2. The apparatus of claim 1, wherein:
the processing circuitry is further configured to generate the public key free from communication with the core network, and
the public key is a cell-specific public key.

3. The apparatus of claim 1, wherein:
the processing circuitry is further configured to generate the public key free from communication with the core network, and
the public key is associated with a geographical region wider than a cell associated with the apparatus.

4. The apparatus of claim 1, wherein the processing circuitry is further configured to:
broadcast the transmission in response to a determination that the UE has requested the public key.

5. The apparatus of claim 1, wherein the processing circuitry is further configured to:
determine that the UE has requested the public key based on one of reception of a random access request on a specific random access channel (RACH) resource reserved for requesting transmission of the public key or reception of a specific random access preamble reserved for requesting transmission of the public key.

6. The apparatus of claim 1, wherein the processing circuitry is further configured to:
determine that the UE has requested the public key based on reception of a public key request in an RRC Setup Request message.

7. The apparatus of claim 1, wherein the processing circuitry is further configured to:
generate, in response to a determination that the UE has requested the public key, dedicated NAS signaling comprising the public key.

8. The apparatus of claim 1, wherein:
the RRC message is an RRC Setup Complete message; and
the processing circuitry is further configured to generate the public key and decrypt the RRC Setup Complete message free from communication with the core network.

9. The apparatus of claim 1, wherein the processing circuitry is further configured to:
generate, for transmission along with the public key, an indication that indicates whether the public key has changed since a last time the public key was requested by the UE.

10. A non-transitory computer-readable storage medium that stores instructions for execution by one or more processors of a base station, the one or more processors to configure the base station to, when the instructions are executed:
determine whether a request for a public key has been received from a user equipment (UE);
generate, in response to reception of the request, a transmission comprising the public key;
decode, after transmission of the public key, an initial radio resource control (RRC) message from the UE, the initial RRC message comprising an initial non-access stratum (NAS) message, the initial NAS message comprising Network Slice Selection Assistance Information (NSSAI) encrypted using the public key; and
decrypt the NSSAI prior to communicating the NSSAI to a core network associated with the base station.

11. The non-transitory computer-readable storage medium of claim 10, wherein the one or more processors further configure the base station to, when the instructions are executed:
generate the public key free from communication with the core network, wherein the public key is a cell-specific public key.

12. The non-transitory computer-readable storage medium of claim 10, wherein the one or more processors further configure the base station to, when the instructions are executed:
generate the public key free from communication with the core network, wherein the public key is associated with a geographical region wider than a cell associated with the base station.

13. The non-transitory computer-readable storage medium of claim 10, wherein the one or more processors further configure the base station to, when the instructions are executed:
broadcast the transmission in response to a determination that the UE has requested the public key.

14. The non-transitory computer-readable storage medium of claim 10, wherein the one or more processors further configure the base station to, when the instructions are executed:

determine that the UE has requested the public key based on one of reception of a random access request on a specific random access channel (RACH) resource reserved for requesting transmission of the public key or reception of a specific random access preamble reserved for requesting transmission of the public key.

15. The non-transitory computer-readable storage medium of claim 10, wherein the one or more processors further configure the base station to, when the instructions are executed:
determine that the UE has requested the public key based on reception of a public key request in an RRC Setup Request message.

16. The non-transitory computer-readable storage medium of claim 10, wherein the one or more processors further configure the base station to, when the instructions are executed:
generate, in response to a determination that the UE has requested the public key, dedicated NAS signaling comprising the public key.

17. The non-transitory computer-readable storage medium of claim 10, wherein:
the RRC message is an RRC Setup Complete message; and
the one or more processors further configure the base station to, when the instructions are executed:
generate the public key and decrypt the RRC Setup Complete message free from communication with the core network.

18. The non-transitory computer-readable storage medium of claim 10, wherein the one or more processors further configure the base station to, when the instructions are executed:
generate, for transmission along with the public key, an indication that indicates whether the public key has changed since a last time the public key was requested by the UE.

19. An apparatus comprising:
a memory configured to store instructions; and
processing circuitry configured to execute the instructions to:
cause transmission to a base station of a request for a public key on either a specific random access channel (RACH) resource reserved for requesting transmission of the public key or a specific random access preamble reserved for requesting transmission of the public key;
receive a transmission from the base station, the transmission comprising the public key; and
cause transmission to the base station of an initial radio resource control (RRC) message including an initial non-access stratum (NAS) message, the initial NAS message including Network Slice Selection Assistance Information (NSSAI) encrypted using the public key.

* * * * *